United States Patent
Klafter et al.

(10) Patent No.: US 8,760,016 B2
(45) Date of Patent: Jun. 24, 2014

(54) ELECTRIC MACHINE WITH ENHANCED COOLING

(75) Inventors: Leon Klafter, Brielle, NJ (US); David C. Wideman, Fairport, NY (US); David Butler, Rochester, NY (US)

(73) Assignee: Exelis Inc., McLean, VA (US)

( * ) Notice: Subject to any disclaimer, the term of this patent is extended or adjusted under 35 U.S.C. 154(b) by 292 days.

(21) Appl. No.: 13/194,133

(22) Filed: Jul. 29, 2011

(65) Prior Publication Data

US 2013/0026868 A1    Jan. 31, 2013

(51) Int. Cl.
*H02K 9/00* (2006.01)

(52) U.S. Cl.
USPC .............. 310/61; 310/60 R; 310/58; 310/59; 310/62

(58) Field of Classification Search
USPC ................... 310/62, 61, 60 R, 58, 59
See application file for complete search history.

(56) References Cited

U.S. PATENT DOCUMENTS

| | | | | |
|---|---|---|---|---|
| 2,413,525 | A * | 12/1946 | Smith | 310/57 |
| 3,761,748 | A * | 9/1973 | Baumann et al. | 310/58 |
| 5,084,641 | A * | 1/1992 | Saima et al. | 310/51 |
| 5,331,238 | A * | 7/1994 | Johnsen | 310/58 |
| 5,698,913 | A * | 12/1997 | Yagi et al. | 310/58 |
| 6,384,494 | B1 * | 5/2002 | Avidano et al. | 310/58 |
| 6,703,730 | B2 * | 3/2004 | Hayashi | 310/62 |
| 6,815,849 | B2 * | 11/2004 | Serizawa et al. | 310/62 |
| 6,839,236 | B2 * | 1/2005 | Yamamoto et al. | 361/704 |
| 7,122,923 | B2 * | 10/2006 | Lafontaine et al. | 310/58 |
| 7,282,823 | B2 * | 10/2007 | Hilton | 310/62 |
| 7,598,634 | B2 * | 10/2009 | Izumi | 310/58 |
| 2003/0222520 | A1 * | 12/2003 | Yokota | 310/63 |
| 2004/0124722 | A1 * | 7/2004 | Uchida et al. | 310/54 |
| 2004/0164628 | A1 * | 8/2004 | Serizawa et al. | 310/61 |
| 2006/0017334 | A1 * | 1/2006 | Gotmalm | 310/54 |
| 2006/0022529 | A1 * | 2/2006 | De Filippis et al. | 310/58 |
| 2006/0091744 | A1 * | 5/2006 | Hilton | 310/62 |
| 2006/0170294 | A1 * | 8/2006 | Du | 310/63 |
| 2006/0250034 | A1 * | 11/2006 | Umezu | 310/67 R |
| 2006/0284511 | A1 * | 12/2006 | Evon et al. | 310/216 |
| 2007/0108851 | A1 * | 5/2007 | Hashiba et al. | 310/58 |
| 2007/0152519 | A1 * | 7/2007 | Jarrah et al. | 310/58 |
| 2008/0061638 | A1 * | 3/2008 | Lulic | 310/62 |
| 2009/0010771 | A1 * | 1/2009 | Vinson et al. | 417/366 |
| 2009/0200884 | A1 * | 8/2009 | Lafontaine et al. | 310/114 |
| 2009/0284087 | A1 * | 11/2009 | Takahashi et al. | 310/62 |
| 2010/0289386 | A1 * | 11/2010 | Gerstler et al. | 310/60 A |
| 2012/0212083 | A1 * | 8/2012 | Himmelmann | 310/54 |
| 2012/0248908 | A1 * | 10/2012 | Zahora et al. | 310/62 |

FOREIGN PATENT DOCUMENTS

| | | | | |
|---|---|---|---|---|
| JP | 53064703 | A * | 6/1978 | H02K 1/12 |
| WO | WO2006007709 | A1 | 1/2006 | |

* cited by examiner

*Primary Examiner* — Tran Nguyen
*Assistant Examiner* — Alex W Mok
(74) *Attorney, Agent, or Firm* — Cantor Colburn LLP

(57) ABSTRACT

An electric machine includes a casing have a first end plate and a second end plate, the first end plate having an air inlet and the second end plate having an air outlet; an outer rotor positioned inside the casing; a stator positioned inside the outer rotor; a hub positioned inside the stator; a fan positioned within the casing, the fan drawing air from the air inlet and exhausting air out the air outlet.

9 Claims, 3 Drawing Sheets

ELECTRIC MACHINE WITH ENHANCED COOLING

BACKGROUND OF THE INVENTION

Electric machines, such as motors and generators, convert electrical power to mechanical power, and vice versa. A typical electric machine includes a stator having electrical windings wound on stator poles. Whether operating as a motor or a generator, the stator is subjected to changing magnetic fields, which create heat in the stator windings. The heat in the stator windings reduces the efficiency of the machine. This problem is particularly prominent in internal stator machines, in which the stator is inside the rotor preventing direct access to ambient surroundings. Thus, techniques for removing heat from a stator of an electric machine would be well received in the art.

BRIEF SUMMARY OF THE INVENTION

An exemplary embodiment of the invention is an electric machine including a casing have a first end plate and a second plate, the first end plate having an air inlet and the second endplate having an air outlet; an outer rotor positioned inside the casing; a stator positioned inside the outer rotor; a hub positioned inside the stator; a fan positioned within the casing, the fan drawing air from the air inlet and exhausting air out the air outlet.

Other aspects, features, and techniques of the invention will become more apparent from the following description taken in conjunction with the drawings.

DETAILED DESCRIPTION

Embodiments of the invention relate to providing enhanced cooling to an electric machine by providing enhanced airflow through the machine. Exemplary embodiments are described with reference to an alternator, but it is understood that embodiments may be applied to different electric machines, including motors, generators, etc.

Figure 1:
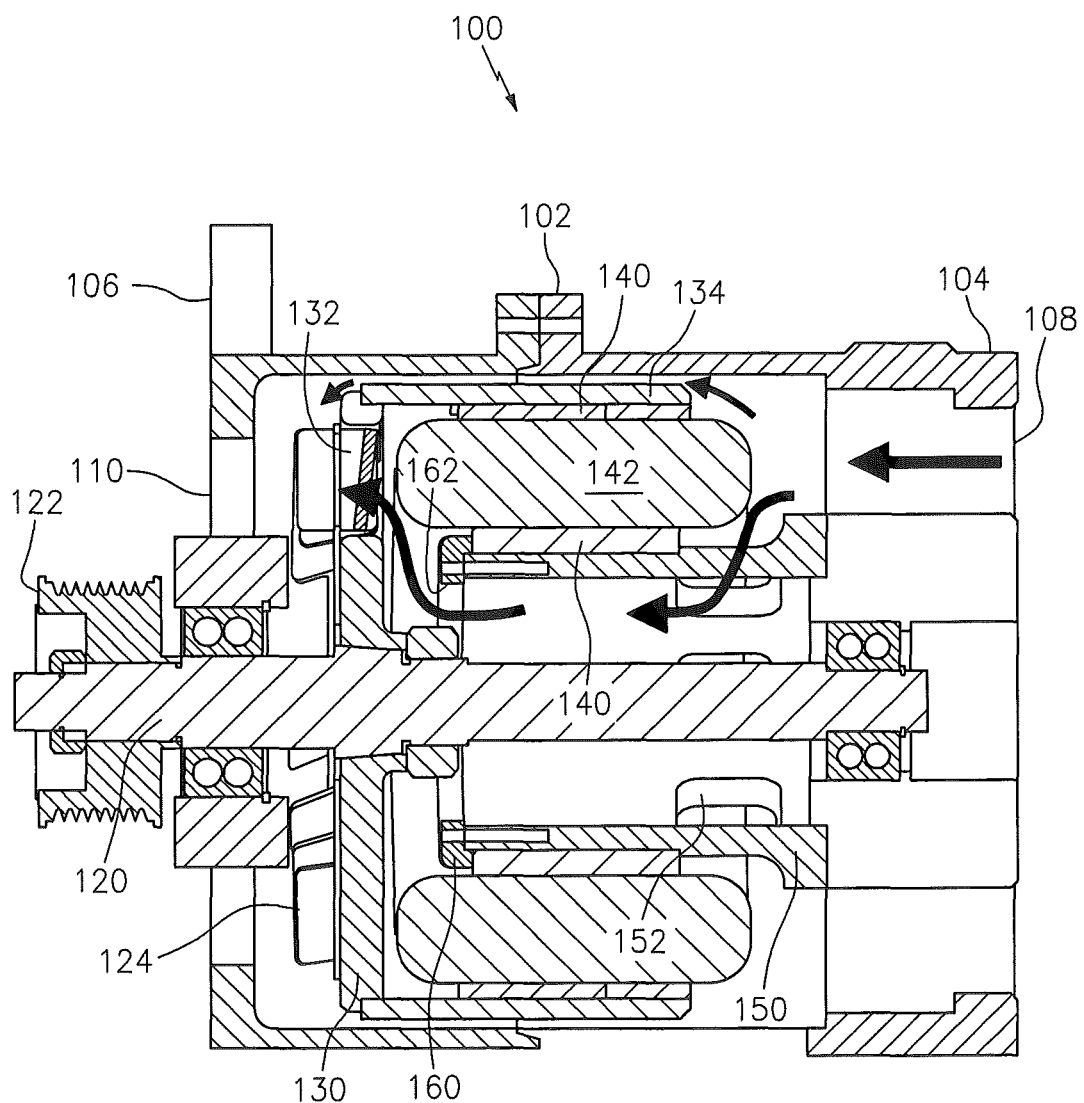
FIG. 1 is a cross-sectional view of an alternator in an exemplary embodiment.

FIG. 1 is a cross-sectional view of an electric machine 100 (e.g., an alternator) in an exemplary embodiment. Alternator 100 includes a casing 102 having a first end plate 104 and a second end plate 106. The casing may be made from steel. An inlet 108 in the first end plate 104 allows air to be drawn through the alternator 100 and discharged through outlet 110 in the second end plate 106. A shaft 120 (e.g., stainless steel) is coupled to a pulley 122, which is turned by a belt (not shown). Shaft 120 is coupled to and turns a fan 124 that is positioned within casing 102. Fan 124 draws air from inlet 108 to outlet 110 as described in further detail herein.

Shaft 120 is also coupled to and turns a rotor end plate 130 (e.g., aluminum). Rotor end plate 130 is a generally circular plate contacting one end of an outer rotor 134. Rotor end plate 130 includes a plurality of openings 132 formed therein. Openings 132 are positioned radially about a center of the rotor end plate 130. The cylindrical outer rotor 134 is coupled to the rotor end plate 130 at one end. As known in the art, the outer rotor 134 includes a plurality of permanent magnets (e.g., neodymium) of alternating polarity. Rotation of shaft 120 rotates outer rotor 134.

A cylindrical stator 140 (e.g., silicon steel) is positioned inside the outer rotor 134 and includes windings 142 (e.g., copper wire) wrapped about a number of stator poles. As known in the art, rotation of outer rotor 134 causes a varying magnetic field, which induces current in windings 142. Stator 140 may be made from a laminate of a plurality of stator sections.

Positioned inside the laminated stator 140 is a hub 150 (e.g., stainless steel). Hub 150 is generally cylindrical and provides an internal support structure for the alternator. A retaining ring 160 is mounted to a second end of the hub 150 and supports a bearing for shaft 120. Retaining ring 160 is a generally circular plate sealing one end of the hub 150. Retaining ring 160 also includes a number of retaining ring openings 162 positioned radially about a center of the retaining ring 160. At a first end of hub 150, a plurality of hub openings 152 are circumferentially positioned in the hub wall. The hub openings 152 allow air to flow through the hub wall and into the interior of the hub 150 for cooling.

In operation, when shaft 120 is turned, fan 124 draws air into the alternator through inlet 108. The drawn in air may flow through multiple paths in the interior of alternator 100. A first air path includes inlet 108, a gap between the outer rotor 134 and the casing 102, and outlet 110. A second air path includes inlet 108, hub openings 152, retaining ring openings 162, rotor end plate openings 132 and outlet 110. Drawing air through the interior of hub 150 helps reduce heat and improves cooling of the alternator.

Figure 2:
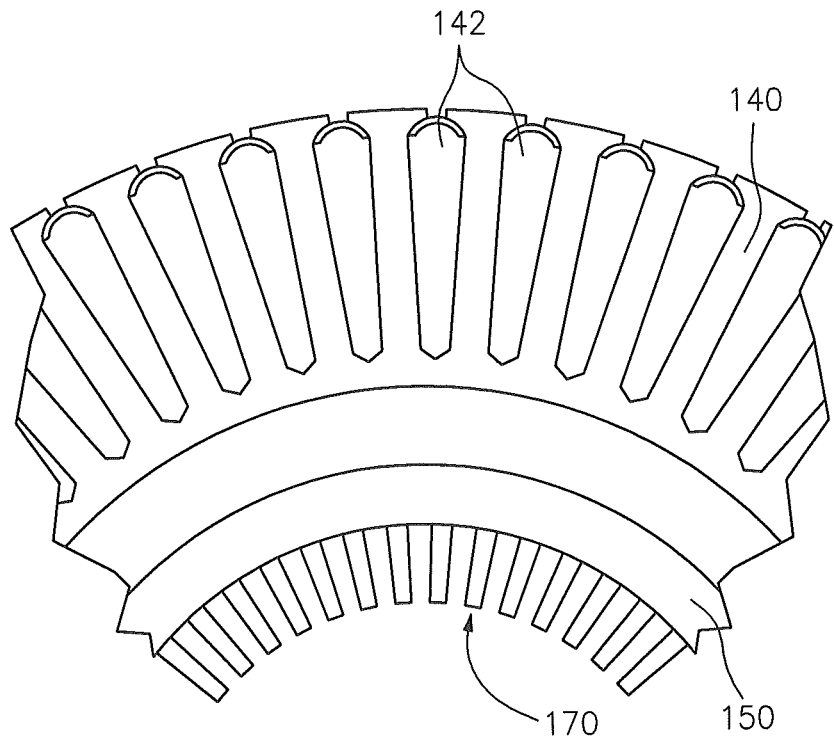
FIG. 2 depicts fins on an alternator hub in an alternate embodiment.

FIG. 2 depicts a portion of the laminate stator 140 and hub 150 in an alternate embodiment. As shown in FIG. 2, hub 150 includes fins 170 extending radially, inwardly from an interior surface of hub 150. Fins 170 may be made from the same material as hub 150 (e.g., stainless steel) and machined along with hub 150. Alternatively, fins 170 may be secured to hub 150 using thermally conductive adhesives, soldering, brazing, etc. Fins 170 may be made from various metals such as stainless steel, copper, and aluminum. Heat from the stator windings 142 is conveyed to the stator 140, the hub 150 and fins 170. Air passing over fins 170 removes heat from the fins 170. If the distal ends fins 170 are not close to shaft 120, a baffle may be placed between shaft 120 and the distal ends of fins 170 to prevent air from bypassing fins 170.

The number and size of fins 170 may be varied depending on the cooling requirements needed. In one embodiment, 32 fins are equally spaced on the inside surface of hub 150, each fin ⅛ inch thick and 0.5 inches long. The fins are machined along with the hub to be integral with the hub 150 and the same material as hub 150 (e.g., stainless steel). In another embodiment, 96 copper fins are used, each 0.04 inches thick and 0.75 inches long. The coppers fins are secured to the hub 150 using thermally conductive adhesive or other techniques.

Figure 3:
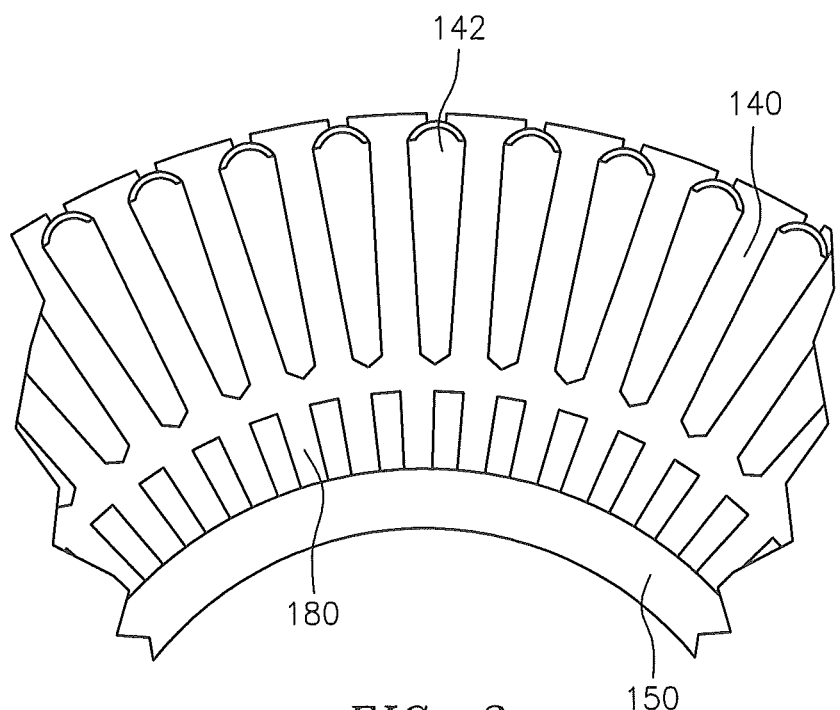
FIG. 3 depicts fins on a stator in an alternate embodiment.
Figure 4:
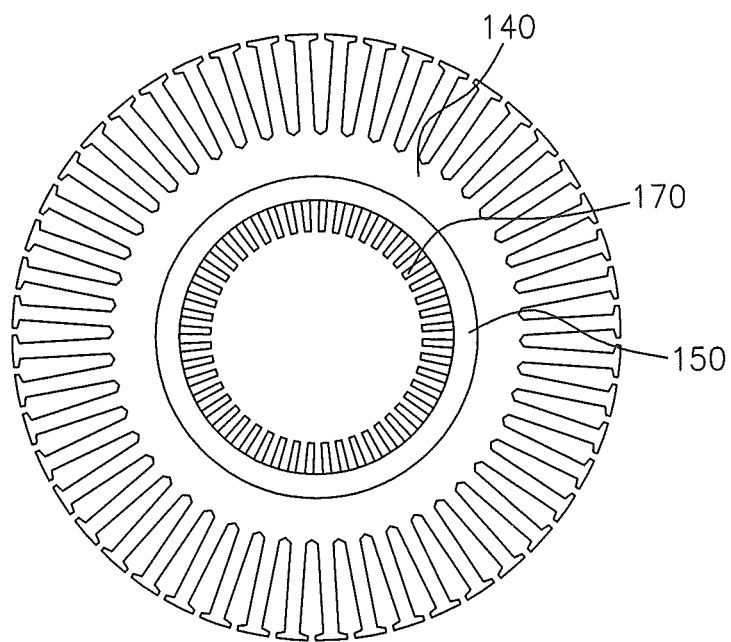
FIG. 4 depicts fins on an alternator hub in an alternate embodiment.
Figure 5:
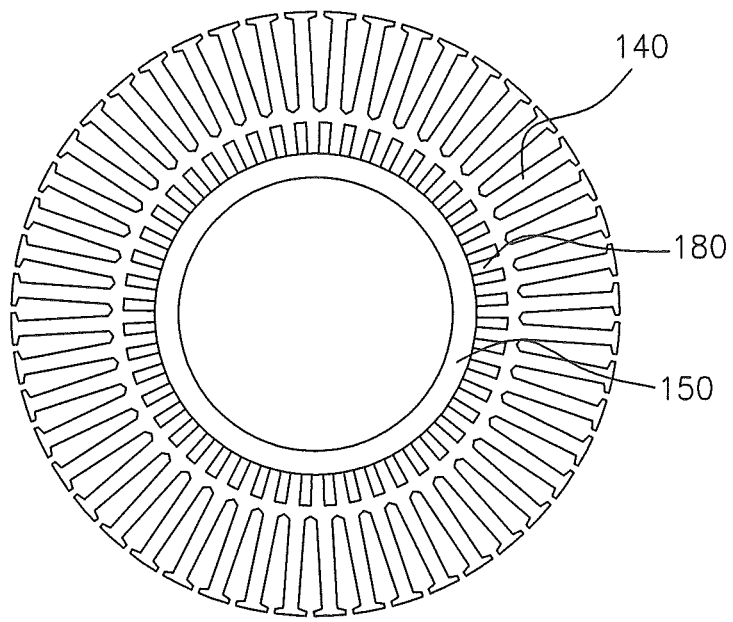
FIG. 5 depicts fins on a stator in an alternate embodiment.

FIG. 3 depicts a portion of the stator 140 and hub 150 in another alternate embodiment. As shown in FIG. 3, stator 140 includes fins 180 extending radially, inwardly from an interior surface of stator 140. Fins 180 may be made from the same material as stator 140 (e.g., silicon steel) and machined along with stator 140. If the stator 140 is a laminate stator, then fins 180 are stamped along with each lamination. Alternatively, fins 180 may be secured to stator 140 using thermally conductive adhesives, soldering, brazing, etc. Fins 180 may be made from various metals such as stainless steel, copper, and aluminum. Heat from the stator windings 142 is conveyed to the laminate 140, the fins 180.

The number and size of fins 180 may be varied depending on the cooling requirements needed. In one embodiment, 46 fins are equally spaced on the inside surface of stator 140, each fin 1/8 inch thick and 0.34 inches long. In another embodiment, 32 fins are used, each fin 1/8 inch thick and 0.34 inches long. In these embodiments, fins 180 are stamped along with stator 140 laminations.

In the embodiment of FIG. 3, the outer diameter of the hub 150 is reduced so that the fins 180 may be longer. Further, hub openings 152 are eliminated to direct air between the stator 140 and hub 150 over fins 180. Air passing over fins 180 removes heat from the fins 180, and as a result, the stator windings 142.

While the invention has been described with reference to exemplary embodiments, it will be understood by those skilled in the art that various changes may be made and equivalents may be substituted for elements thereof without departing from the essential scope thereof. Therefore, it is intended that the invention not be limited to the particular embodiments disclosed for carrying out the invention, but that the invention will include all embodiments falling within the scope of the appended claims.

What is claimed is:

1. An electric machine comprising:
   a casing have a first end plate and a second end plate, the first end plate having an air inlet and the second endplate having an air outlet;
   an outer rotor positioned inside the casing;
   a stator positioned inside the outer rotor;
   a hub positioned inside the stator;
   a rotor endplate coupled to an end of the outer rotor, the rotor end plate including a rotor end plate opening for allowing air to pass through the rotor endplate;
   a fan positioned within the casing, the fan drawing air from the air inlet and exhausting air out the air outlet;
   a shaft positioned inside the stator, the shaft coupled to the rotor end plate and coupled to the fan to rotate the fan and the rotor endplate simultaneously;
   a retaining ring coupled to an end of the hub, the retaining ring including a retaining ring opening for allowing air to pass through the retaining ring; and
   fins on the inside of the hub, the fins extending from an inside surface of the hub radially inwardly towards the shaft;
   wherein the hub includes a hub opening formed in a wall of the hub for allowing air to pass through the hub wall, the air inlet, hub opening, retaining ring opening, rotor end plate opening and air outlet defining an air path through the electric machine.

2. The electric machine of claim 1 wherein:
the fins are machined with the hub to be integral with the hub.

3. The electric machine of claim 1 wherein:
the fins are separate from the hub and secured to the hub.

4. The electric machine of claim 3 wherein:
the fins are secured to the hub with a thermally conductive adhesive.

5. The electric machine of claim 1 wherein:
the fins are machined with the stator to be integral with the stator.

6. The electric machine of claim 5 wherein:
the stator is a laminated stator, the fins being stamped along with laminations of the stator.

7. The electric machine of claim 1 wherein:
the fins are separate from the stator and secured to the stator.

8. The electric machine of claim 7 wherein:
the fins are secured to the stator with a thermally conductive adhesive.

9. The electric machine of claim 1 wherein:
the electric machine is an alternator.

* * * * *